United States Patent
Austrheim (10) Patent No.: US 12,312,176 B2
(45) Date of Patent: May 27, 2025

(54) DELIVERY SYSTEM, AN AUTOMATED STORAGE AND RETRIEVAL SYSTEM AND A METHOD OF TRANSPORTING A CONTAINER

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 593 days.

(21) Appl. No.: 17/637,419

(22) PCT Filed: Aug. 21, 2020

(86) PCT No.: PCT/EP2020/073559
§ 371 (c)(1),
(2) Date: Feb. 22, 2022

(87) PCT Pub. No.: WO2021/032888
PCT Pub. Date: Feb. 25, 2021

(65) Prior Publication Data
US 2022/0274781 A1    Sep. 1, 2022

(30) Foreign Application Priority Data
Aug. 22, 2019    (NO) .................................. 20191009

(51) Int. Cl.
*B65G 1/137*    (2006.01)
(52) U.S. Cl.
CPC .................................. *B65G 1/1375* (2013.01)
(58) Field of Classification Search
CPC .. B65G 1/0492; B65G 1/0457; B65G 1/1378; B65G 2201/0235; G05D 2201/0216
See application file for complete search history.

(56) References Cited

U.S. PATENT DOCUMENTS

| 4,909,697 A | 3/1990 | Bernard, II et al. |
| 5,246,332 A | 9/1993 | Bernard, II et al. |

(Continued)

FOREIGN PATENT DOCUMENTS

| CA | 2988122 A1 | 12/2016 |
| CN | 101711210 A | 5/2010 |

(Continued)

OTHER PUBLICATIONS

Office Action issued in Chinese application No. 202080059213.5 mailed on Feb. 1, 2023 (21 pages).

(Continued)

*Primary Examiner* — Kyle O Logan
(74) *Attorney, Agent, or Firm* — Baker Botts L.L.P.

(57) ABSTRACT

A delivery system for transport of a container to an access point for handling of items held in the container by a human and/or robotic operator includes a delivery rail grid, a delivery vehicle, and a container accessing station. The delivery rail grid includes at least a first set of parallel rails arranged in a horizontal plane and extending in a first direction, and at least a second set of parallel rails arranged in the horizontal plane and extending in a second direction, which is orthogonal to the first direction. The at least first and second sets of rails together define a plurality of delivery grid cells. The delivery vehicle is adapted for carrying the container and operating on the delivery rail grid. The container accessing station includes the access point. At least one conveyor line extends into the access point and is operationally connected to the delivery rail grid. The delivery vehicle is arranged for delivering/receiving the container to/from the at least one conveyor line and wherein the at least one conveyor line is arranged for transport of the container between the delivery vehicle and the access point.

17 Claims, 8 Drawing Sheets

(56) References Cited

U.S. PATENT DOCUMENTS

| | | | |
|---|---|---|---|
| 6,011,998 A | 1/2000 | Lichti et al. | |
| 9,714,139 B1 | 7/2017 | Aggarwal | |
| 9,988,216 B1 | 6/2018 | McCalib, Jr. et al. | |
| 2005/0118003 A1 | 6/2005 | Mitchell et al. | |
| 2009/0136328 A1* | 5/2009 | Schafer | B65G 1/1378 414/807 |
| 2011/0203231 A1* | 8/2011 | Hortig | B65B 67/02 53/235 |
| 2012/0101627 A1* | 4/2012 | Lert | B65G 1/1373 700/216 |
| 2013/0302132 A1 | 11/2013 | D'Andrea | |
| 2014/0086714 A1 | 3/2014 | Malik | |
| 2014/0244026 A1 | 8/2014 | Neiser | |
| 2015/0086304 A1* | 3/2015 | Hasman | B65G 1/1378 414/269 |
| 2015/0127143 A1* | 5/2015 | Lindbo | G05B 15/02 700/218 |
| 2016/0009493 A1* | 1/2016 | Stevens | B65G 1/1373 700/216 |
| 2016/0031644 A1 | 2/2016 | Schubilske | |
| 2016/0129587 A1* | 5/2016 | Lindbo | B25J 9/0096 700/218 |
| 2016/0130085 A1* | 5/2016 | Yamashita | B65G 1/1378 414/807 |
| 2016/0145058 A1* | 5/2016 | Lindbo | B65G 1/0457 700/218 |
| 2016/0325932 A1* | 11/2016 | Hognaland | B60L 15/40 |
| 2016/0355337 A1* | 12/2016 | Lert | B65G 1/0492 |
| 2017/0313514 A1* | 11/2017 | Lert, Jr. | B65G 1/0492 |
| 2017/0362039 A1* | 12/2017 | Eisenberg | B65G 47/46 |
| 2018/0029798 A1* | 2/2018 | Lindbo | B65G 1/137 |
| 2018/0037410 A1* | 2/2018 | DeWitt | B07C 3/087 |
| 2018/0043528 A1* | 2/2018 | Lindbo | B65G 1/065 |
| 2018/0065804 A1* | 3/2018 | Hognaland | B65G 1/0464 |
| 2018/0068253 A1 | 3/2018 | Simms et al. | |
| 2018/0075402 A1* | 3/2018 | Stadie | G06Q 10/04 |
| 2018/0082162 A1 | 3/2018 | Durham et al. | |
| 2018/0118078 A1 | 5/2018 | Alkhaldi et al. | |
| 2018/0141754 A1 | 5/2018 | Garrett et al. | |
| 2018/0150793 A1 | 5/2018 | Lert, Jr. et al. | |
| 2018/0162639 A1* | 6/2018 | Ingram-Tedd | B65G 1/0464 |
| 2018/0178979 A1* | 6/2018 | Bretz | B65G 1/0407 |
| 2018/0194571 A1* | 7/2018 | Fryer | B66F 9/07504 |
| 2018/0237223 A1* | 8/2018 | Lindbo | E04B 2/7403 |
| 2018/0244467 A1* | 8/2018 | Hognaland | B65G 1/0478 |
| 2018/0305123 A1* | 10/2018 | Lert, Jr. | G06Q 10/087 |
| 2018/0346243 A1* | 12/2018 | Lindbo | B65G 1/065 |
| 2019/0031399 A1* | 1/2019 | Shaikh | B65D 21/0209 |
| 2019/0054932 A1* | 2/2019 | Stadie | B61B 5/02 |
| 2019/0375588 A1* | 12/2019 | Lindbo | B65G 1/0464 |
| 2020/0031575 A1* | 1/2020 | Hognaland | B25J 9/1687 |
| 2020/0339350 A1* | 10/2020 | Dooley | B66F 7/0625 |

FOREIGN PATENT DOCUMENTS

| | | |
|---|---|---|
| CN | 104885106 A | 9/2015 |
| CN | 105600252 A | 5/2016 |
| CN | 105947514 A | 9/2016 |
| CN | 106575391 A | 4/2017 |
| CN | 106829298 A | 6/2017 |
| CN | 107708940 A | 2/2018 |
| CN | 107848707 A | 3/2018 |
| CN | 108140168 A | 6/2018 |
| CN | 108430895 A | 8/2018 |
| CN | 109328150 A | 2/2019 |
| CN | 109982948 A | 7/2019 |
| CN | 110065751 A | 7/2019 |
| DE | 4016810 C1 | 11/1991 |
| DE | 9310690 U1 | 9/1993 |
| DE | 102009017241 A1 | 10/2010 |
| DE | 102013009340 A1 | 12/2014 |
| DE | 102017222801 A1 | 6/2019 |
| EP | 0458021 A1 | 11/1991 |
| EP | 0493327 A1 | 7/1992 |
| EP | 1452462 A2 | 9/2004 |
| EP | 2881905 A1 | 6/2015 |
| EP | 3003932 A1 | 4/2016 |
| JP | 2000044010 A | 2/2000 |
| JP | 2015535517 A | 12/2015 |
| JP | 2016525490 A | 8/2016 |
| NO | 317366 B1 | 10/2004 |
| NO | 20161642 A1 | 4/2018 |
| NO | 20170360 A1 | 9/2018 |
| NO | 20170754 A1 | 11/2018 |
| NO | 20171064 A1 | 12/2018 |
| WO | 96/14258 A1 | 5/1996 |
| WO | 2014/075937 A1 | 5/2014 |
| WO | 2014/090684 A1 | 6/2014 |
| WO | 2014/195901 A1 | 12/2014 |
| WO | 2014/195902 A1 | 12/2014 |
| WO | 2014/203126 A1 | 12/2014 |
| WO | 2015/118171 A1 | 8/2015 |
| WO | 2015/193278 A1 | 12/2015 |
| WO | 2016/196815 A1 | 12/2016 |
| WO | 2016/198467 A1 | 12/2016 |
| WO | 2016/198565 A1 | 12/2016 |
| WO | 2017/081281 A1 | 5/2017 |
| WO | 2017/097724 A1 | 6/2017 |
| WO | 2017/121515 A1 | 7/2017 |
| WO | 2018/050816 A1 | 3/2018 |
| WO | 2018/053236 A1 | 3/2018 |
| WO | 2018/162757 A1 | 9/2018 |
| WO | 2018/233886 A1 | 12/2018 |
| WO | 2019/141877 A1 | 7/2019 |

OTHER PUBLICATIONS

Office Action issued in U.S. Appl. No. 15/734,431; Dated Oct. 2, 2023 (81 pages).
International Search Report issued in PCT/EP2020/073559 on Nov. 20, 2020 (5 pages).
Written Opinion of the International Searching Authority issued in PCT/EP2020/073559 on Nov. 20, 2020 (12 pages).
Norwegian Search Report issued in No. 20191009 mailed on Mar. 20, 2020 (2 pages).
Norwegian Search Report issued in Patent Application No. 20181581mailed on Feb. 20, 2019 (3 pages).
Office Action issued in European Application No. 19730152.6 mailed on Dec. 23, 2021 (7 pages).
Office Action issued in Chinese application No. 201980039028.7 mailed on Oct. 27, 2021 (15 pages).
Office Action issued in Chinese Application No. 201980038106.1 mailed on Sep. 8, 2021 (6 pages).
Norwegian Search Report issued in Patent Application No. 20181344 mailed on May 16, 2019 (3 pages).
Office Action issued in Chinese application No. 2019800393783 maield on Dec. 9, 2021 (12 pages).
International Search Report issued in Application No. PCT/EP2019/065145 mailed on Sep. 16, 2019 (6 pages).
International Search Report issued in Application No. PCT/EP2019/065184 mailed on Sep. 12, 2019 (5 pages).
International Search Report issued in Application No. PCT/EP2019/065189 mailed on Sep. 12, 2019 (5 pages).
Written Opinion issued in Application No. PCT/EP2019/065145 mailed on Sep. 16, 2019 (10 pages).
Written Opinion issued in Application No. PCT/EP2019/065184 mailed on Sep. 12, 2019 (11 pages).
Written Opinion issued in Application No. PCT/EP2019/065189 mailed on Sep. 12, 2019 (10 pages).
Hirokazu Moribayashi, Decision for Reasons for Rejection for Japanese Patent Application No. 2022510975, dated Jan. 20, 2025, 5 pages, pub. by the JPO.

* cited by examiner

DELIVERY SYSTEM, AN AUTOMATED STORAGE AND RETRIEVAL SYSTEM AND A METHOD OF TRANSPORTING A CONTAINER

The present invention is related to a delivery system for transport of a storage container between a first location and a second location which is an access point. The access point is provided in a container accessing station provided with at least one conveyor line. The invention is also related to an automated storage and retrieval system comprising the delivery system and a method of transporting a container.

BACKGROUND AND PRIOR ART

Figure 1:
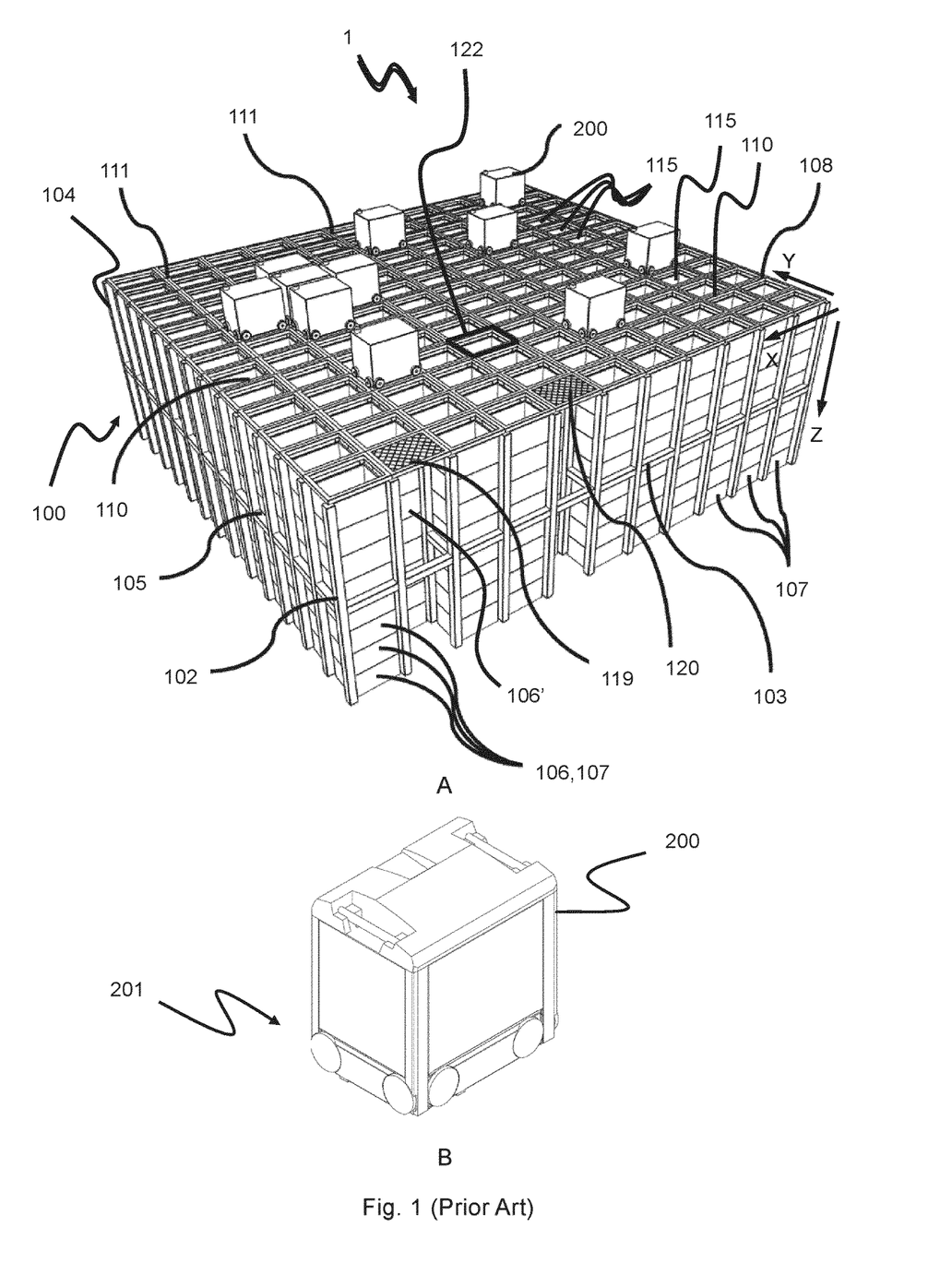

FIGS. 1A and 1C disclose a typical prior art automated storage and retrieval system 1 with a framework structure 100. FIGS. 1B and 1D disclose a prior art container handling vehicle 101 operating the system 1 disclosed in FIGS. 1A and 1C, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 of storage containers 106, also known as bins, are stacked one on top of another to form stacks 107.

Each storage container 106 may typically hold a plurality of product items (not shown), and the product items within a storage container 106 may be identical or may be of different product types depending on the application.

The storage grid 104 guards against horizontal movement of the storage containers 106 in the stacks 107, and guides vertical movement of the storage containers 106, but does normally not otherwise support the storage containers 106 when stacked. The automated storage and retrieval system 1 comprises a rail system 108 arranged in a grid pattern across the top of the storage 104, on which rail system 108 a plurality of container handling vehicles 200,300 (as exemplified in FIGS. 1B and 1D) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 1C marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110, 111.

The rail system 108 comprises a first set of parallel rails 110 arranged to guide movement of the container handling vehicles 200, 300 in a first direction X across the top of the frame structure 100, and a second set of parallel rails 111 arranged perpendicular to the first set of rails 110 to guide movement of the container handling vehicles 200, 300 in a second direction Y which is perpendicular to the first direction X. In this way, the rail system 108 defines grid columns above which the container handling vehicles 200, 300 can move laterally above the storage columns 105, i.e. in a plane which is parallel to the horizontal X-Y plane.

Each prior art container handling vehicle 200, 300 comprises a vehicle body and a wheel arrangement of eight wheels 201, 301 where a first set of four wheels enable the lateral movement of the container handling vehicles 200, 300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200, 300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201, 301 so that the position of the gripping/engaging devices with respect to the vehicle 201, 301 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid 104 disclosed in FIGS. 1A and 1C, Z=8 identifies the lowermost, bottom layer of the grid 104. Consequently, as an example, and using the Cartesian coordinate system X, Y, Z indicated in FIGS. 1A and 1D, the storage container identified as 106' in FIG. 1A can be said to occupy grid location or cell X=10, Y=2, Z=3. The container handling vehicles 101 can be said to travel in layer Z=0 and each grid column can be identified by its X and Y coordinates.

Each container handling vehicle 200 comprises a storage compartment or space (not shown) for receiving and stowing a storage container 106 when transporting the storage container 106 across the rail system 108. The storage space may comprise a cavity arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles 200 may have a footprint which is larger than the lateral extent of (lateral area defined by) a grid column 105, e.g. as is disclosed in WO2014/090684A1.

Figure 2:
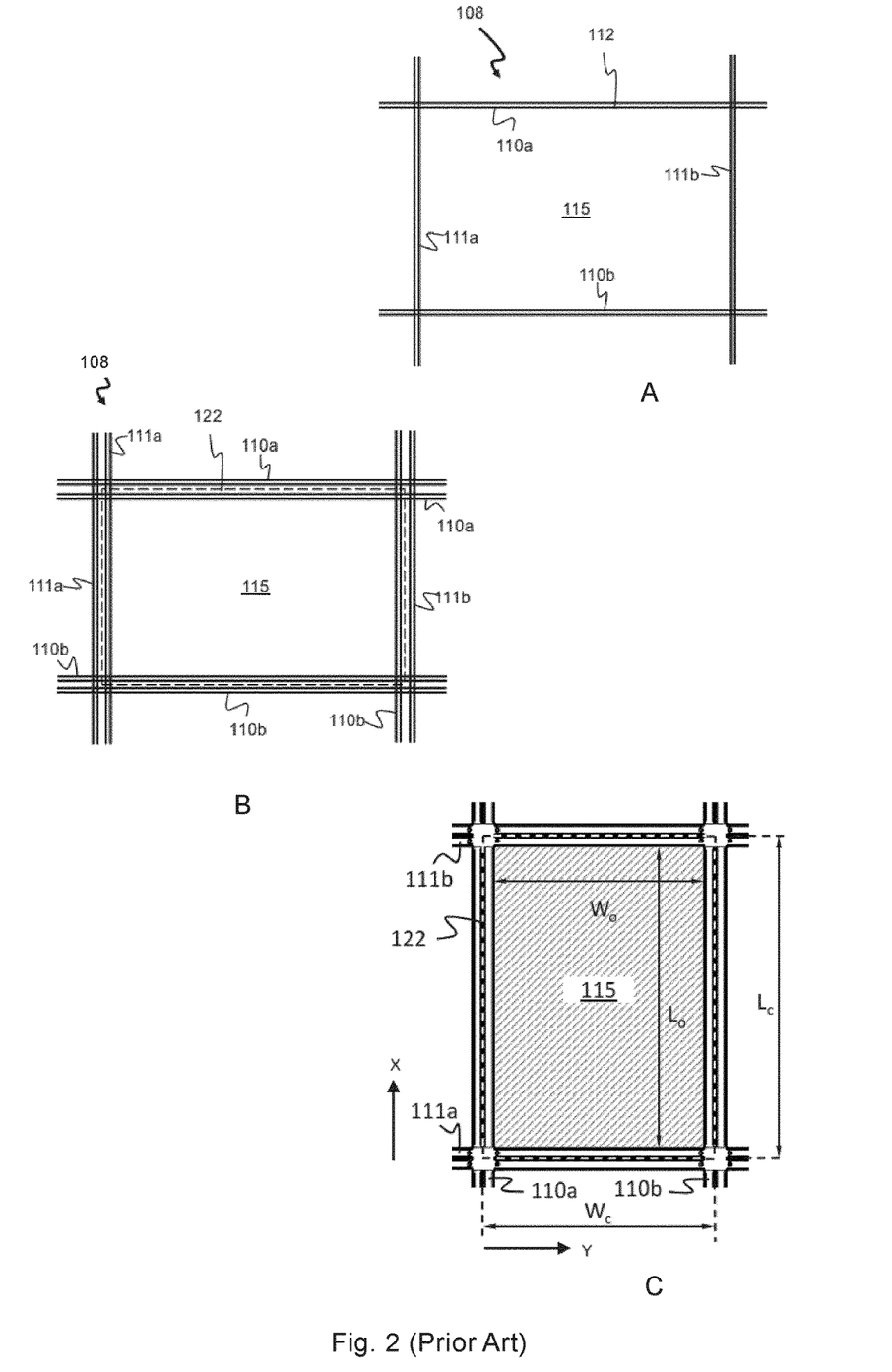
FIGS. 2A-C is a view from top of a grid cell comprising a set of parallel rails arranged to guide movement of a remotely operated vehicle.

The rail system 108 may be a single rail system, as is shown in FIG. 2A. Alternatively, the rail system 108 may be a double rail system, as is shown in FIG. 2B, thus allowing a container handling vehicle 201 having a footprint generally corresponding to the lateral area defined by a grid column 112 to travel along a row of grid columns even if another container handling vehicle 200 is positioned above a grid column neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a, 110b of the first rails 110 and a pair of rails 111a, 111b of the second set of rails 111. In FIG. 2B the grid cell 122 is indicated by a dashed box.

Consequently, rails 110a and 110b form pairs of rails defining parallel rows of grid cells running in the X direction, and rails 111a and 111b form pairs of rails defining parallel rows of grid cells running in the Y direction.

As shown in FIG. 2C, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighboring grid cells are arranged in contact with each other such that there is no space there-between.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 200, 300 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column in which the port is located may be referred to as a "delivery column" 119, 120. The drop-off and pick-up ports of the container handling vehicles are referred to as the "upper ports of a delivery column" 119, 120. While the opposite end of the delivery column is referred to as the "lower ports of a delivery column".

The storage grids 104 in FIGS. 1A and 1C comprise two delivery columns 119 and 120. The first delivery column 119 may for example comprise a dedicated drop-off port where the container handling vehicles 200, 300 can drop off storage containers 106 to be transported through the delivery column 119 and further to an access or a transfer station, and the second delivery column 120 may comprise a dedicated pick-up port where the container handling vehicles 200, 300 can pick up storage containers 106 that have been transported through the delivery column 120 from an access or a transfer station. Each of the ports of the first and second delivery column may comprise a port suitable for both pick up and drop of storage containers.

When a storage container 106 stored in the grid 104 disclosed in FIG. 1A is to be accessed, one of the container handling vehicles 200, 300 is instructed to retrieve the target storage container 106 from its position in the grid 104 and to transport it to or through the delivery column 119. This operation involves moving the container handling vehicle 200, 300 to a grid location above the storage column 105 in which the target storage container 106 is positioned, retrieving the storage container 106 from the storage column 105 using the container handling vehicle's lifting device (not shown), and transporting the storage container 106 to the delivery column 119.

If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200, 300 that is subsequently used for transporting the target storage container 106 to the delivery column, or with one or a plurality of other cooperating container handling vehicles 200, 300. Alternatively, or in addition, the automated storage and retrieval system 1 may have container handling vehicles 200, 300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200, 300 is instructed to pick up the storage container 106 from the delivery column 120 and to transport it to a grid location above the storage column 105 where it is to be stored. After any storage containers positioned at or above the target position within the storage column stack 107 have been removed, the container handling vehicle 200, 300 positions the storage container 106 at the desired position. The removed storage containers may then be lowered back into the storage column 105 or relocated to other storage columns 105.

A container accessing station may typically be a picking or a stocking station where product items are removed from or positioned into the storage containers 106. In a picking or a stocking station, the storage containers 106 are normally never removed from the automated storage and retrieval system 1 but are returned into the storage grid 104 once accessed. For transfer of storage containers out or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

The picking and stocking operation at the container accessing station may be performed by a human operator. Despite measures being in place already to reduce a risk that the human operator may injure himself/herself, improvements are always desirable. In addition, as robotic operators, such as robotic arms, become more common in these areas, it is also desirable to avoid damage to those devices, wherever possible.

An objective of the invention is therefore to provide an automated storage and retrieval system which is more effective than prior art systems, provides safety to the operator and increases the delivery capacity to the access point.

Another object of the invention is to provide a system that enables effective packing of items held in storage containers for further transport of the packed items.

SUMMARY OF THE INVENTION

The present invention is directed to a delivery system for transport of a container to an access point for handling of items held in the container by a human and/or robotic operator.

The delivery system comprising:
- a delivery rail grid comprising at least a first set of parallel rails arranged in a horizontal plane (P1) and extending in a first direction (X), and at least a second set of parallel rails arranged in the horizontal plane (P1) and extending in a second direction (Y) which is orthogonal to the first direction (X), the at least first and second sets of rails together defining a plurality of delivery grid cells, a delivery vehicle adapted for carrying the container and operating on the delivery rail grid, and a container accessing station comprising the access point, and at least one conveyor line extending into the access point and operationally connected to the delivery rail grid.

The delivery vehicle is arranged for delivering/receiving the container to/from the at least one conveyor line and wherein the at least one conveyor line is arranged for transport of the container between the delivery vehicle and the access point.

The container may be a storage container, a KLT box, a packing box, etc. Thus, the term "container" is related to any container suitable for holding one or more items. The "container" may be made of any material suitable for the purpose of holding at least one item, such as plastic, metal, wood, paper, etc.

A KLT box is an industrial stacking container conforming to the VDA 4500 standard. The most common sizes are 600 mm×400 mm and 400 mm×300 mm, meaning that these containers stacked upon each other will fill a Euro-pallet measuring 1200 mm×800 mm. These containers may be stacked and are manufactured typically in grey polypropylene or another thermoplastic by injection molding.

The term "operationally connected" means that the container may be transported between two connected areas, i.e. the at least one conveyor and the delivery grid. Even though the at least one conveyor and the delivery grid are not located on the same level.

The delivery system of the present invention may be arranged for transport of a container between a first location and a second location which may be the access point.

The first location may be an external location in relation to the delivery system. The external location is reachable by the delivery vehicle operating on the delivery system. Thus, the external location may be connected to the delivery system such that the delivery vehicle may retrieve or deliver a container from/to the external location. There may be one or more external locations connected to the delivery system.

The external location may be any location on or external to the delivery system that is arranged or set up to perform a certain task (such as assembling, production, shipment, etc.) in relation to the storage and retrieval system. Thus, a defined area on the delivery system set up to perform a certain task (packing, assembling, production, etc.) may be defined as an external location.

The one or more external location may be a high priority area which may be an area linked to an automated storage and retrieval system for packaging and shipment, distribution, sales or production purposes.

The one or more external location may be at least any one of: a storage grid, a packing and assembling area, an expedition location, a production area, a shipment and transport area, etc.

The external location may be reached by a delivery vehicle via the delivery rail grid.

The external location may be located on a different level than the delivery rail grid.

The external location may be connected to the delivery system such that the delivery vehicle may receive a container from the external location for transport across the delivery rail grid, and vice versa.

The delivery vehicle may receive a container from a container handling vehicle for transport across the delivery rail grid. Accordingly, the delivery vehicle may deliver a container to a container handling vehicle for transport to an external location, such as a storage grid.

The delivery vehicle may comprise a motorized vehicle body and a container carrier provided above the motorized vehicle body for carrying the container.

The container carrier may comprise a conveyor arranged to convey the container on and off the container carrier in a horizontal direction.

The conveyor may comprise a plurality of parallel oriented rolls having a common longitudinal direction perpendicular to one or more side walls. In this way the rolls allow one or more containers to be shifted into or off the container carrier while being guided by the side walls. The conveyor may be connected to a motor for rotation of one or more of the rolls. Other types of conveyor are also possible such as belt or chain.

In the following, rollers may also include belt or chain drive.

The conveyor motor may operate reversibly for moving the rollers in an opposite direction.

The delivery vehicle may further comprise:

a first set of wheels, arranged at first opposite portions of the delivery vehicle for moving the delivery vehicle along a first direction (X) on the delivery rail grid; and a second set of wheels, arranged at second opposite portions of the delivery vehicle for moving the delivery vehicle along a second direction (Y) on the delivery rail grid, the second direction (Y) being perpendicular to the first direction (X).

The at least one conveyor line may comprise at least any one of: rollers, belt, chain, etc. The at least one conveyor line is operated by a drive motor.

The drive motor may be reversible for moving the rollers, belt, chain, etc., in an opposite direction.

An upper surface of at least one conveyor line is provided at same height as an upper surface of the container carrier that the container is carried on. This allows the container to easily enter or exit the at least one conveyor line from the delivery vehicle.

The container may be transported on the rollers to/from the access point on the same conveyor line. That means that the drive motor drives the rollers for transporting the container to the access point, and after the container has been accessed, the drive motor is reversed for transporting the container in opposite direction, away from the access point and towards the point on the conveyor line where the container may be picked up by a delivery vehicle.

The conveyor line may also be arranged in a loop (U-turn) with an entering port and an exit port for the container. The system may comprise a first conveyor line and a second conveyor line arranged in parallel and operationally connected to each other such that a container may be moved from the first conveyor line to the second conveyor line, and vice versa. For example, the container may enter at one end of the first conveyor line and transported to the access point. After the container has been accessed at the access point, it may move over to the second conveyor line and transported further to a point of the second conveyor line where it may be picked up by a delivery vehicle.

The system may comprise a third conveyor line comprising rollers arranged perpendicular to the rollers of the first and second conveyor. The access point may be provided at the third conveyor line, such that the container may be accessed before it is transported on the third conveyor line to the second conveyor line. Thus, the container may enter at the first conveyor line, move to the second conveyor line, via the third conveyor line, and exit from the second conveyor line. The third conveyor line may be operated separate from the first and second conveyor line.

The third conveyor line may comprise a lift or tilt mechanism for lifting (lowering)/tilting the third conveyor line (rollers) relative to the first and second conveyor line, for allowing the container to enter into or exit from the third conveyor line.

The system may comprise a lift device for lifting the container such that is not in contact with the rollers (conveyor) at the access point. The lift device comprises a motorized band or chain for moving the container from one conveyor line to another.

The first and second conveyor line may each have a length so that it can transport two or more containers in a row. The length of the first conveyor line may increase the delivery capacity of storage containers to the access point in that the delivery vehicles may work efficiently by continuously delivering containers to the first conveyor line for transport to the access point. Each container, after been handled at the access point, moves over to the second conveyor line and waits in line to be collected by a delivery vehicle for further transport.

The container accessing station may comprise walls or enclosure panels arranged about the access point and at least a section of the at least one conveyor line.

The container accessing station may comprises two or more conveyor lines arranged separate, side by side, and in parallel. Separate means that they are not connected, and that the container may enter and exit from the same conveyor line.

The two or more conveyor lines comprises a first conveyor line and a second conveyor line arranged in the same horizontal plane (P2).

The delivery vehicle may be arranged to deliver a first container to the first conveyor line and move to the second conveyor line to receive a second container which has been handled at the access point.

An advantage of the present invention is that it is able to provide a delivery system that is effective, provides safety for the operator, and increases the delivery capacity to the access point. It achieves this by increasing the availability of a delivery vehicle by reducing the time period of waiting, while situated at the access point. Thus, the delivery vehicle does not need to stay occupied at the access port but may move in order to perform other tasks.

Instead of waiting for the human and/or robotic operator while they are performing handling of items stored in the container, the delivery vehicle may move to a second conveyor line for collecting another storage container which has already been handled at the access point.

At the access point, the items stored in the storage container may be put into packaging boxes for further transport and handling. By including the storage container and the packaging box at the container accessing station provides a compact and flexible workspace where the containers are close to the operator and the handling may be performed faster.

This saves operational time, since the delivery vehicle may, after it has delivered the storage container, move to an adjacent location for collecting another container (storage container or packaging box) which has already been handled at the access point.

The invention is also related to an automated storage and retrieval system comprising a storage grid for storage of storage containers and a delivery system as described above.

The storage grid comprises:
- a container handling vehicle rail system for guiding a plurality of container handling vehicles, the container handling vehicle rail system comprising at least a first set of parallel rails arranged in a horizontal plane (P) and extending in a first direction (X), and at least a second set of parallel rails arranged in the horizontal plane (P) and extending in a second direction (Y) which is orthogonal to the first direction (X), which first and second sets of rails form a grid pattern in the horizontal plane (P) comprising a plurality of adjacent container handling vehicle grid cells, each container handling vehicle grid cell comprising a container handling vehicle grid opening defined by a pair of neighboring rails of the first set of rails and a pair of neighboring rails of the second set of rails; and
- a delivery column adapted for transfer of a storage container between a container handling vehicle operating on the container handling vehicle rail system and a delivery vehicle operating on the delivery vehicle rail system.

The storage containers may be stored in a stack of storage containers in a storage column of the storage and retrieval grid.

The container handling vehicle may be arranged to retrieve a storage container from a storage location in the storage and retrieval grid and transport it to the delivery column for transfer through the delivery column to a delivery vehicle located at the lower end of the delivery column. Accordingly, the container handling vehicle may retrieve the storage container from a delivery vehicle, trough the delivery column, for transport to a storage location in the storage and retrieval grid.

The container handling vehicle may deliver the container trough the delivery—or transfer column and directly to a delivery vehicle. The container handling vehicle may accordingly retrieve a container from a delivery vehicle directly through the delivery—and transfer column and transport the container to a storage location within the storage grid.

A delivery port may be located at the lower end of the delivery column.

The remotely operated delivery vehicle may be arranged to transport the storage container from the delivery port of the delivery column of the storage grid, across the delivery grid to the at least one conveyor line and return it or a different storage container, to the delivery port of the delivery column, for storage within the storage grid.

The remotely operated delivery vehicle may also pick up another container (which is not a storage container) for transport to an external location.

The delivery system may comprise a first delivery rail grid and a second delivery rail grid.

The first delivery rail grid may be located within the grid structure (vertically below) of the storage grid and the second delivery rail grid is located outside the grid structure of the storage grid.

The first and the second delivery rail grids are connected such that the delivery vehicle may operate between the first and second delivery rail grids.

The container accessing station and the access point may be located on the second delivery rail grid.

The access point may be part of a container accessing station, the container accessing station comprising one of a row of access points in the container accessing station each able to hold a container whilst it is being accessed.

The container accessing station may comprise two rows of access points, one arranged opposite the other and spaced apart by between three and five container lengths. An operator may access several containers for collecting items into one packaging box or KLT containers.

The container accessing station may comprise a further row of access points arranged at ninety degrees to the other two rows of access points (the conventional picking station). An operator may access several containers delivered to the access points from different locations.

The invention is also related to a method of transporting a container to an access point of a delivery system as described above. The access point being a location on the delivery rail grid for a robotic or human operator to access an item held in the container that has been delivered to the access point.

The method comprises the step of:
a) operating the delivery vehicle carrying a first container to direct the delivery vehicle to the at least one conveyor line;
b) operating the delivery vehicle to deliver the first container to the conveyor line for transport to the access point;
c) operating the delivery vehicle to receive a second container that has been handled at the access point from the at least one conveyor line,
d) transporting the second container to an external location.

As described earlier, the external location may comprise a high priority area.

The high priority area of the external location may be at least any one of a: storage grid, production area, packing and assembling area, expedition area, etc.

BRIEF DESCRIPTION OF THE DRAWINGS

Following drawings are appended by way of example only to facilitate the understanding of the invention.

FIGS. 1A-D are perspectives view of a prior art automated storage and retrieval system, where FIG. 1A and FIG. 1C shows the complete system and FIG. 1B and FIG. 1D shows examples of system operable prior art container handling vehicles.

DETAILED DESCRIPTION OF THE INVENTION

In the following, embodiments of the invention will be discussed in more detail with reference to the appended drawings. It should be understood, however, that the drawings are not intended to limit the invention to the subject-matter depicted in the drawings.

Furthermore, even if some of the features are described in relation to the delivery vehicle only, it is apparent that they are valid for the system and related methods as well, and vice versa.

With reference to FIGS. 1A-D the storage grid 104 of each storage structure 1 constitutes a framework 100 of in total 143 grid columns 112, where the width and length of the framework corresponds to the width and length of 13 and 11 grid columns 112, respectively. The top layer of the framework 100 is a rail system 108 onto which a plurality of container handling vehicles 200, 300 are operated.

The framework 100 of the storage system 1 is constructed in accordance with the above mentioned prior art framework 100 described above, i.e. a plurality of upright members 102 and a plurality of horizontal members 103 which are supported by the upright members 102, and further that the horizontal members 103 includes the rail system 108 of parallel rails 110, 111 in the X direction and the Y direction, respectively, arranged across the top of storage columns 105. The horizontal area of a single grid cell 122, i.e. along the X and Y directions, may be defined by the distance between adjacent rails 110 and 111, respectively (see also FIGS. 2B and 2C). In FIGS. 1A and 1C, such a grid cell 122 is marked on the rail system 108 by thick lines.

The rail system 108 allows the container handling vehicles 200, 300 to move horizontally between different grid locations, where each grid location is associated with a grid cell 122.

In FIGS. 1A and 1C the storage grid 104 is shown with a height of eight cells. It is understood, however, that the storage grid 104 can in principle be of any size. In particular it is understood that storage grid 104 can be considerably wider and/or longer than disclosed in FIGS. 1A and 1C. For example, the grid 104 may have a horizontal extent of more than 700×700 grid cells 122. Also, the grid 104 can be considerably deeper than disclosed in FIGS. 1A and 1C. For example, the storage grid 104 may be more than twelve grid cells deep.

The storage container vehicles 200, 300 may be of any type known in the art, e.g. any one of the automated container handling vehicles disclosed in WO2014/090684 A1, in NO317366 or in WO2015/193278A1.

The rail system 108 may be a single rail system, as is shown in FIG. 2A. Alternatively, the rail system 108 may be a double rail system, as is shown in FIG. 2B. The rail system 108 may also be a combination of single and double rails. Details of the single and double rail system are disclosed this specification under the section of background and prior art.

Figure 3:
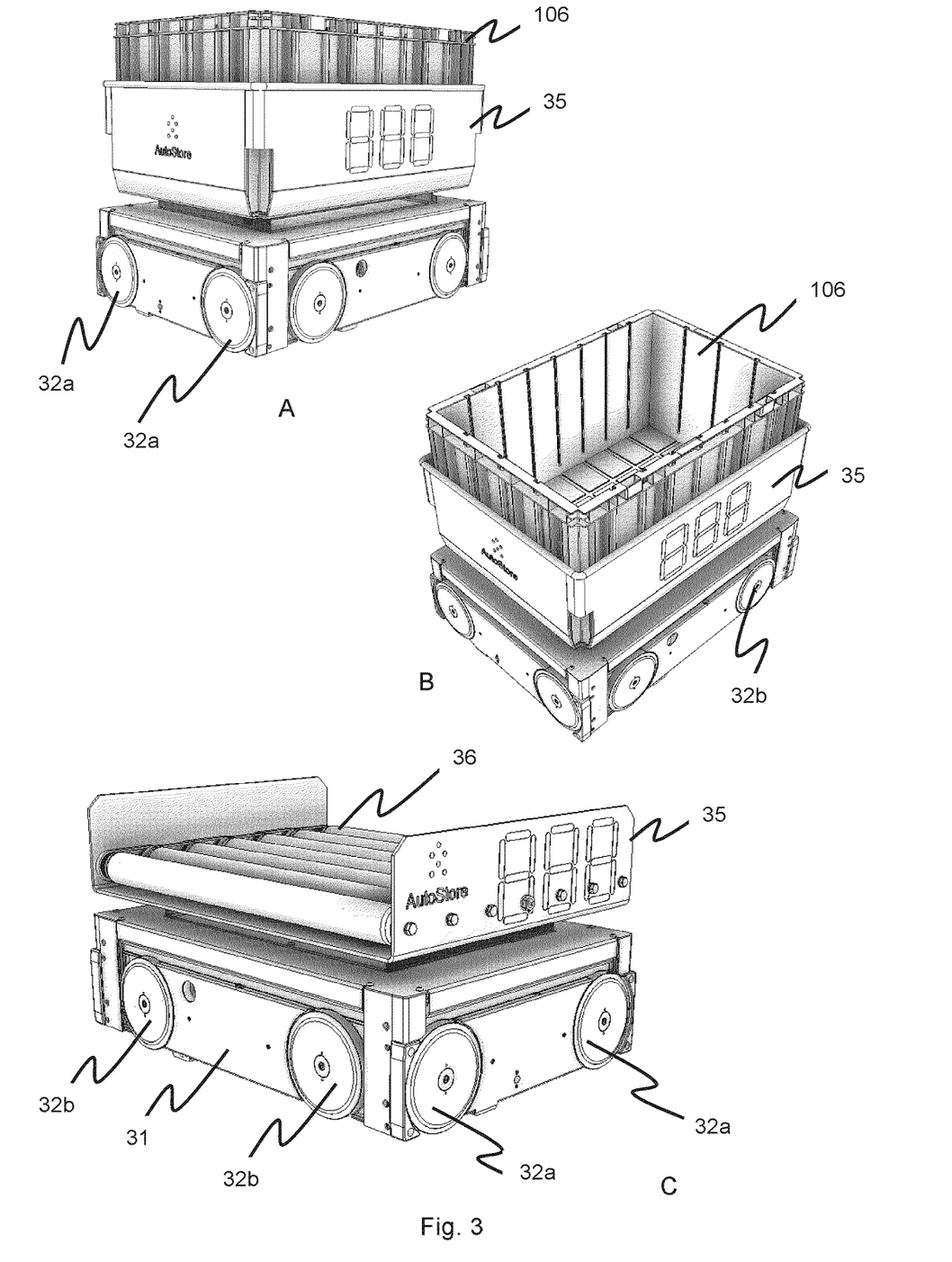
FIGS. 3A-C shows different versions of a remotely operated delivery vehicle arranged for transporting a storage container between a first location and a second location which is an access point.

FIG. 3A-C shows an embodiment of a remotely operated delivery vehicle 30, hereinafter referred to as a delivery vehicle 30.

Figure 4:
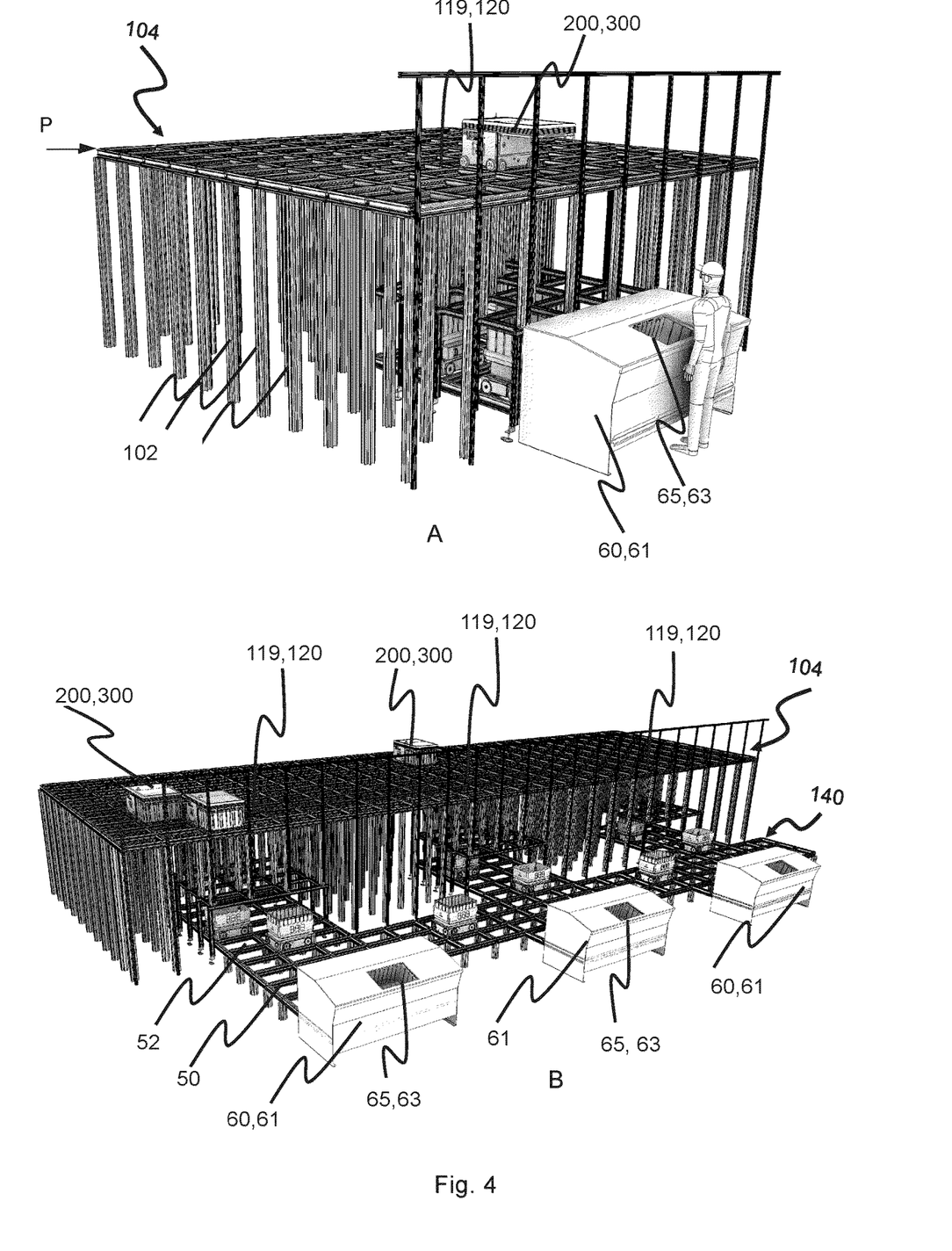
FIGS. 4A-B are perspective views of other automated storage and retrieval grids and delivery systems for transporting storage containers between the storage grid and a container accessing station.

The delivery vehicle 30 is configured for transport of a storage container 106 (not shown in FIG. 3C) between an automated storage and retrieval grid 104 (see FIGS. 4A and B) configured to store a plurality of stacks 107 of storage containers 106, hereinafter referred to as a storage grid 104, and an access point 65 provided in a container accessing station 60 for handling of the storage container 106 by at least one of a robotic operator and a human operator.

In the following, a container accessing station will also be referred to as a container handling station.

Said delivery vehicle 30 comprises; a vehicle body 31, at least one rolling device 32a, 32b connected to the vehicle body 31, at least one rolling device motor for driving the rolling device 32a, 32b in a horizontal plane (P), and a power source (not shown) connected to the rolling device motor. The power source should provide sufficient power to the rolling device motor (not shown) to propel the rolling device 32a, 32b over a set route from the storage grid 104, for example, to the container accessing station 60.

The delivery vehicle 30 may further comprise a container carrier 35 mounted above the vehicle body 31. The container carrier 35 should be configured to receive the storage container 106, for example, onto or within the container carrier 35, such that the storage container 106 is prevented from sliding in a horizontal plane (P1) with respect to the delivery vehicle 30.

The container carrier 35 may comprise a container supporting device supporting the storage container 106 from below.

In FIG. 3A-B the container carrier 35 is disclosed in the form of a storage container receiving compartment having a bottom/base and side walls. The volume of the compartment is shown in this exemplary configuration such that it may receive and contain the entire horizontal extent of the storage container and at least a part of the vertical extent of the storage container.

The particular configuration of the container carrier 35 disclosed in 3A-B allows the delivery vehicle 30 to transport storage containers 106 having different heights.

Note that the size of the compartment within the container carrier 35 may easily be adapted for receiving and supporting a multiple number of storage containers 106 in one operation.

FIG. 3C shows yet another exemplary configuration of the remotely operated delivery vehicle 30. In this configuration the container carrier 35 comprises a base plate, a conveyor arranged on the base plate and two side walls protruding upwards from the base plate. The rolling device 32 and the vehicle body 31 are the same as or similar to the rolling device 32 and the vehicle body 31 described above.

The conveyor may be set up by inter alia a plurality of parallel oriented rolls 36 having a common longitudinal direction perpendicular to the two side walls. In this way the rolls 36 allow one or more containers 70 to be shifted into or off the container carrier 35 while being guided by the side walls. The conveyor may be connected to a conveyor motor allowing rotation of one or more of the rolls.

The container carrier 35 shown in FIG. 3A-C may all be adapted to carry different types of containers 70, such as KLT boxes, packaging boxes, in addition to storage containers 106 and other style of containers with main purpose of holding items.

Perspective views of an automated storage and retrieval system are shown in FIG. 4A-B. The system comprises a storage grid 104 and a delivery system 140 comprising a delivery rail grid 50, and a plurality of delivery vehicles 30 operating on the delivery rail grid 50.

The storage grid 104 is or may be the same as or similar to the prior art storage grid 104 as described above, i.e. a storage grid 104 comprising a rail system 108; a plurality of stacks 107 of storage containers 106, a plurality of container handling vehicles 300 for lifting and moving storage containers 106 stacked in the stacks 107 and a delivery column 119, 120 configured to receive a storage container 106 from a container handling vehicle 300.

The delivery system 140 comprises one or more of the delivery vehicles 30 as described above, i.e. delivery vehicles 30 configured to receive and support a storage container 106 for transport between one or more delivery columns 119, 120 and one or more container handling stations 60 located outside the storage grid 104. The container handling station 60 may be located in any predetermined position suitable for handling containers.

The delivery system 140 may further comprise a delivery rail grid 50 situated below a delivery port 150 of the one or more delivery columns 119, 120.

The delivery system 140 is arranged such that storage containers 106 delivered through the delivery column 119, 120 by container handling vehicles or a lift, may effectively be received by a delivery vehicle 30 below the delivery port 150 and transported away on the delivery rail grid 50 to the container accessing station 60, thereby avoiding congestion of storage container 106 at the delivery columns 119, 120.

As shown in FIG. 4A-B, the delivery rail grid 50 may be constructed in the same way or a similar way as the rail system 108 for the container handling vehicles 200, 300. The delivery rail grid 50 extends at least from the delivery port 150 of one or more delivery columns 119, 120, and to the at least one container accessing station 60, such that each storage container 106 can be transported into the container accessing station 60 where items held in the storage container 106 may be accessed.

The delivery system 140 may comprise a first delivery rail grid and a second delivery rail grid, wherein the first delivery rail grid is located directly below a grid structure of the storage grid 104 and the second delivery rail grid is located outside the grid structure of the storage grid 104, the first and the second delivery rail grids being connected such that the delivery vehicle 30 can operate between the first and second delivery rail grids, as shown in FIG. 4B.

While FIG. 4A shows a first delivery rail grid located within (directly below) the storage grid structure and a second delivery rail grid extending into the access container accessing station 60 (not shown).

The access point 65 may be one or more delivery grid cells 52 located on the second delivery rail grid.

The container accessing station 60 may comprise a cabinet 61 comprising walls and a top cover supported thereon, as shown in FIG. 4A-B. The items held in the storage containers 106 carried by the delivery vehicle 30 and transported to the access point 65 of the container accessing station 60 are reachable through an access opening 63 in the top cover of the cabinet 61.

The cabinet 61 is arranged adjoining the storage grid 104, where the delivery rail grid 50 extends from below the delivery ports 150 and to the access point 65 of the container accessing station 60.

As mentioned above, the container carrier 35 of the delivery vehicle 30 may be adapted to carry different type of containers 70. The term "container" is therefore directed to different type of containers adapted for holding one or more items.

Figure 5:
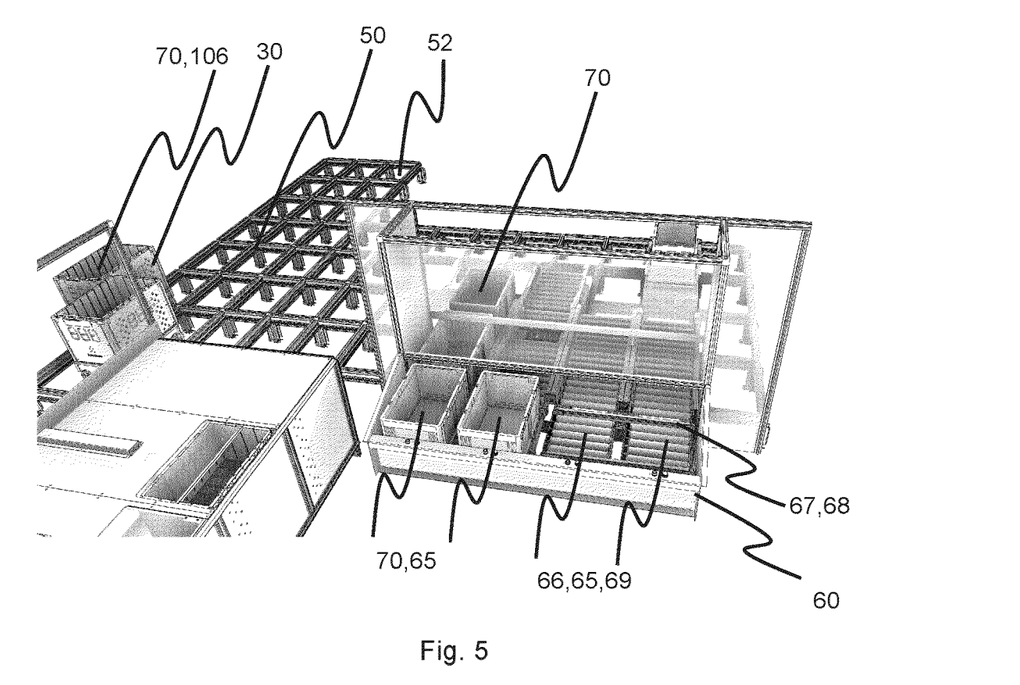
FIG. 5 shows a container accessing station comprising a plurality of conveyor lines which are connected such that the container may enter on one conveyor line and exit on another.

FIG. 5 shows a delivery system 140 for transport of a container 70 to an access point 65 for handling of items held in the container 70 by a human and/or robotic operator.

The delivery system 140 comprising:
a delivery rail grid 50 comprising at least a first set of parallel rails arranged in a horizontal plane (P1) and extending in a first direction (X), and at least a second set of parallel rails arranged in the horizontal plane (P1) and extending in a second direction (Y) which is orthogonal to the first direction (X), the at least first and second sets of rails together defining a plurality of delivery grid cells 52,
a delivery vehicle 30 is adapted for carrying the container 70 and operating on the delivery rail grid 50, and a container accessing station 60 comprising the access point 65, and at least one conveyor line 66 extending into the access point 65 and operationally connected to the delivery rail grid 50.

The delivery vehicle 30 is arranged for delivering/receiving the container 70 to/from the at least one conveyor line 66 and wherein the at least one conveyor line 66 is arranged for transport of the container 70 between the delivery vehicle 30 and the access point 65.

The container carrier 35 of the delivery vehicle 30, in FIG. 3C, may comprise a conveyor 36 arranged to convey the container 70 on and off the container carrier 35 in a horizontal direction.

The conveyor 69 of the at least one conveyor line 66 may comprise a plurality of parallel oriented rolls having a common longitudinal direction perpendicular to a side wall. In this way the rolls allow one or more containers 70 to be shifted into or off the container carrier 35 while being guided by the side walls. The conveyor 69 may be connected to a conveyor motor (not shown) allowing rotation of one or more of the rolls in both directions.

The container accessing station may comprise four conveyor lines 66 arranged separately, side-by-side, and in parallel, as shown in FIGS. 5-7 and 9. Each conveyor line 66 comprises an access point 65 provided at an end of the conveyor line 66. The container 70 may be delivered to the end of the conveyor line 66 located opposite of the access point 65 and transported on motorized rollers to the access point 65. After the container 70 has been handled or accessed at the access point 65, the container 70 is transported back to the end of the conveyor line 66 to be picked up by any available delivery vehicle 30.

The conveyor lines 66 may be separated by walls such that the container 70 may only enter and exit from the same conveyor line 66. Thus, one container 70 may be located on one single conveyor line 66 at the same time.

A delivery vehicle 30 may be operated such that it delivers a container 70 to one of the conveyor line 66 and move over to another conveyor line to receive another container 70 which has been accessed or handled at the access point 65.

As shown in FIG. 5, the access point 65 may comprise a lift device 67 for lifting the container 70 such that is not in contact with the rollers (conveyor) 69 at the access point 65. The lift device 67 may comprise a motorized band 68 for moving the container 70 from a first conveyor line to a second conveyor line 66.

The lifting device 67 may comprise a frame structure supporting the circumference of the container 70 from below. The frame structure is arranged such that it extends from the first conveyor line to the second conveyor line and may comprise a conveyor 69 arranged perpendicular to the moving direction of the first and second conveyor lines 66. When the frame structure is lifted, the container 70 is lifted from the conveyors of the first conveyor line 66 and may move perpendicular such that it is transferred from the first conveyor line to the second conveyor line.

The first and second conveyor line 66 may each have a length that can hold a plurality of containers 70 arranged in a row (see FIG. 5). The length of the first conveyor line may increase the capacity in that the delivery vehicles 30 can deliver more containers 70 to wait in line while travelling to the access point 65. Correspondingly, the second conveyor line 66 may contain several containers 70 that have been accessed at the access point 65 and waiting in line so that they can be picked up by a delivery vehicle 30.

FIGS. 6-10 shows a delivery system 140 according to an embodiment of the invention. The system comprises two container accessing stations 60 according to the present invention, arranged with another container accessing station with a cabinet. An operator may pick items from the different access points 65 provided in the different container accessing stations 60.

Figure 6:
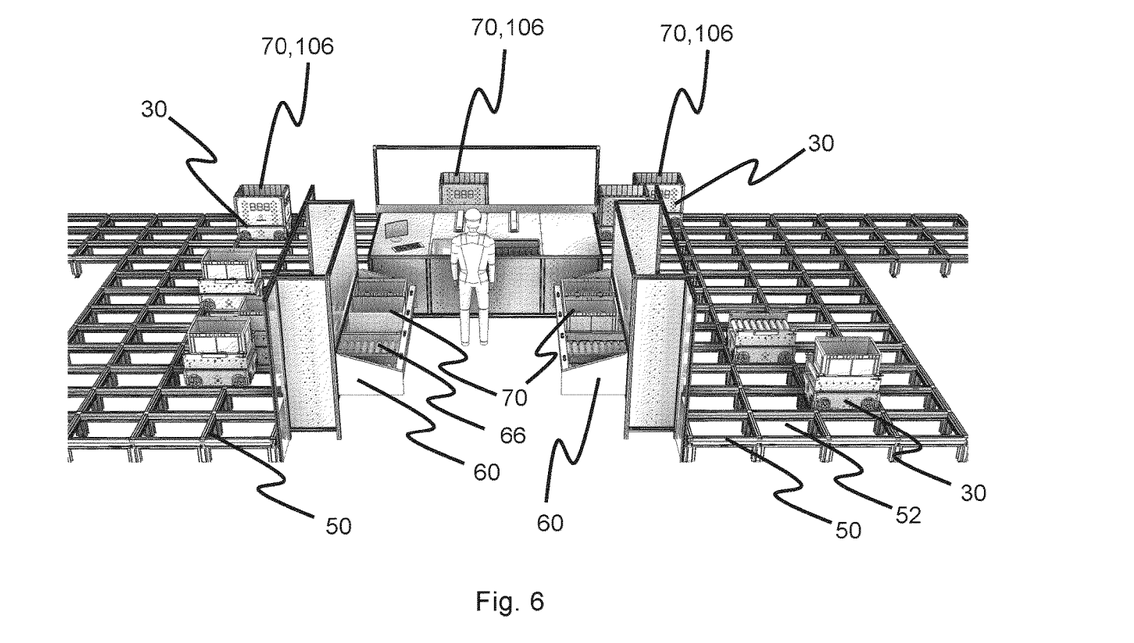
FIG. 6 shows container accessing station comprising a further row of access points arranged at ninety degrees to the other two rows of access points, such that the operator may access several containers delivered to the access points from different locations.
Figure 7:
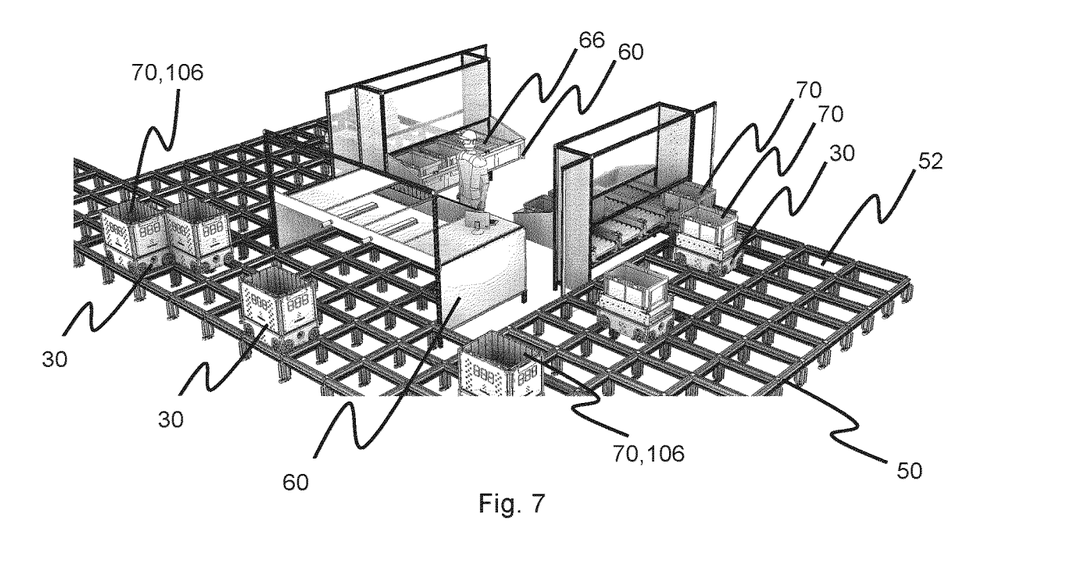
FIGS. 7-9 shows the system of FIG. 6 from different angles.
Figure 8:
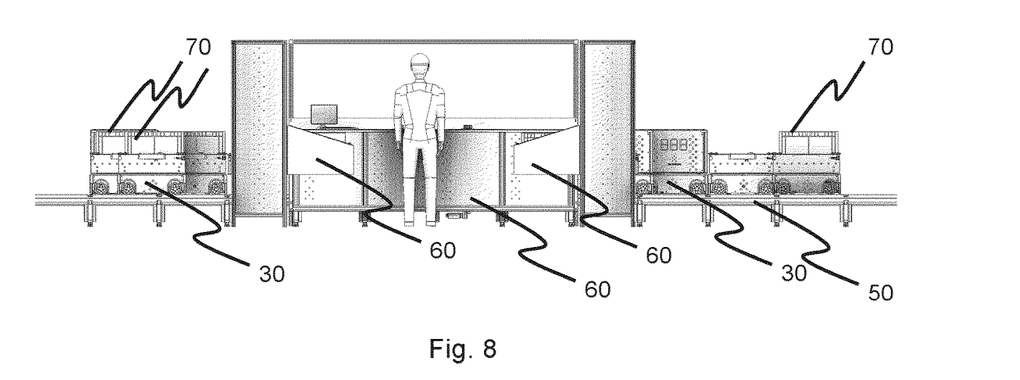
Figure 9:
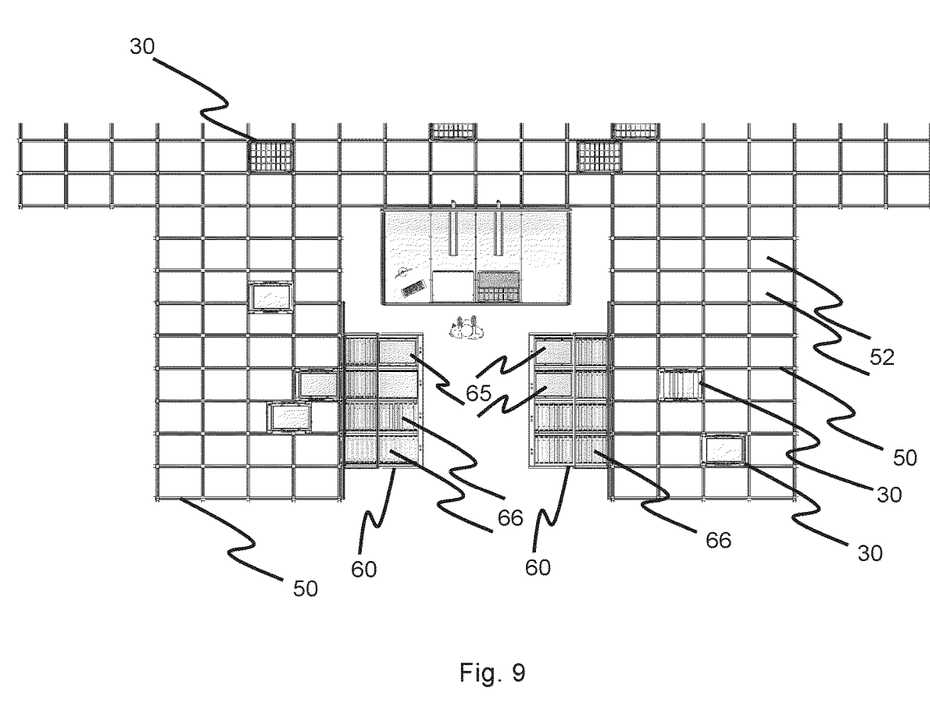

The access point 65 may be part of an access area, the access point 65 comprising one of a row of access points 65 in the access area each able to hold a container 70 whilst it is being accessed.

The access area may comprise two rows of access points 65, one arranged opposite the other and spaced apart by between three and five container lengths. An operator may access several containers for collecting items into one packaging box or KLT containers.

The access area comprises a further row of access points 65 arranged at ninety degrees to the other two rows of access points (the conventional picking station). An operator may access several containers 70 delivered to the access points 65 from different locations.

REFERENCE NUMERALS

30 Delivery vehicle
31 Vehicle body
32 Rolling device
32a First set of wheels
32b Second set of wheels
35 Container carrier
36 Rolls of conveyor
50 Delivery rail grid
52 Delivery grid cell
60 Container accessing station
61 Cabinet
63 Access opening
65 Access point
66 Conveyor line
67 Lift device
68 Motorized band
69 Rollers of conveyor line
70 Container
P2 Horizontal plane of conveyor line
P1 Horizontal plane of delivery rail grid
100 Framework structure
102 Upright members of framework structure
103 Horizontal members of framework structure
104 Storage grid/three-dimensional grid
105 Storage column
106 Storage container
107 Stack
108 Rail system
110 First set of parallel rails in first direction (X)
111 Second set of parallel rails in second direction (Y)
115 Grid opening
119 Delivery column
120 Delivery column
122 Grid cell
140 Delivery system
150 Delivery port
200 First container handling vehicle
201 Wheel arrangement
300 Second container handling vehicle
301 Wheel arrangement
X First direction
Y Second direction
P Horizontal plane of rail system

The invention claimed is:

1. A delivery system for transport of a container to an access point for handling of items held in the container by a human and/or robotic operator,
the delivery system comprising:
a delivery rail grid comprising at least a first set of parallel rails arranged in a horizontal plane and extending in a first direction, and at least a second set of parallel rails arranged in the horizontal plane and extending in a second direction which is orthogonal to the first direction, the at least first and second sets of rails together defining a plurality of delivery grid cells,
a delivery vehicle adapted for carrying the container and operating on the delivery rail grid, and
a container accessing station comprising the access point, and
at least one conveyor line extending into the access point and operationally connected to the delivery rail grid,
wherein the delivery vehicle is arranged for delivering/receiving the container to/from the at least one conveyor line and wherein the at least one conveyor line is arranged for transport of the container between the delivery vehicle and the access point,
wherein the delivery vehicle comprises a motorized vehicle body and a container carrier provided above the motorized vehicle body for carrying the container.

2. The delivery system according to claim 1, wherein the delivery vehicle comprises:
a first set of wheels, arranged at first opposite portions of the delivery vehicle for moving the delivery vehicle along a first direction on the delivery rail; and
a second set of wheels, arranged at second opposite portions of the delivery vehicle for moving the delivery vehicle along a second direction on the delivery rail, the second direction being perpendicular to the first direction.

3. The delivery system according to claim 1, wherein the at least one conveyor line comprises at least any one of a: rollers, belt, chain, etc. with a drive motor.

4. The delivery system according to claim 3, wherein the drive motor is reversible for moving the rollers in an opposite direction.

5. The delivery system according to claim 1, wherein the container accessing station comprises walls or enclosure panels arranged about the access point.

6. The delivery system according to claim 1, wherein an upper surface of the at least one conveyor lines is provided at a same height as an upper surface of the container carrier that the container is carried on.

7. The delivery system according to claim 1, wherein the container accessing station comprises two or more conveyor lines arranged side by side in parallel.

8. The delivery system according to claim 7, wherein the two or more conveyor lines comprises a first conveyor line and a second conveyor line arranged in the same horizontal plane.

9. The delivery system according to claim 7, wherein the delivery vehicle is arranged to deliver a first container to the first conveyor line and move to the second conveyor line to receive a second container which has been handled at the access point.

10. The delivery system according to claim 1, wherein the container carrier comprises a conveyor arranged to convey the container on and off the container carrier in a horizontal direction.

11. An automated storage and retrieval system comprising:
a delivery system for transport of a container to an access point for handling of items held in the container, the delivery system comprising:
a delivery rail grid comprising at least a first set of parallel rails arranged in a horizontal plane and extending in a first direction, and at least a second set of parallel rails arranged in the horizontal plane and extending in a second direction which is orthogonal to the first direction, the at least first and second sets of rails together defining a plurality of delivery grid cells,
a delivery vehicle adapted for carrying the container and operating on the delivery rail grid, and
a container accessing station comprising the access point, and at least one conveyor line extending to the access point and operationally connected to the delivery rail grid,
wherein the delivery vehicle is arranged for delivering the container to the at least one conveyor line and wherein the at least one conveyor line is arranged for transport of the container between the delivery vehicle and the access point,
wherein the delivery vehicle comprises a motorized vehicle body and a container carrier provided above the motorized vehicle body for carrying the container; and
a storage grid for storage of storage containers, wherein the storage grid comprises:
a container handling vehicle rail system for guiding a plurality of container handling vehicles, the container handling vehicle rail system comprising at least a first set of parallel rails arranged in a horizontal plane and extending in a first direction, and at least a second set of parallel rails arranged in the horizontal plane and extending in a second direction which is orthogonal to the first direction, which first and second sets of rails form a grid pattern in the horizontal plane comprising a plurality of container handling vehicle grid openings, each container handling vehicle grid opening defined by a pair of neighboring rails of the first set of rails and a pair of neighboring rails of the second set of rails; and
a delivery column adapted for transfer of a storage container between a container handling vehicle operating on the container handling vehicle rails system and a delivery vehicle operating on the delivery rail system,
wherein the delivery vehicle is arranged to transport the storage container from the delivery column of the storage grid across the delivery rail grid to the at least one conveyor line.

12. The automated storage and retrieval system according to claim 11, wherein the delivery vehicle can pick up a different container from a second conveyor line, for transport to an external location.

13. The automated storage and retrieval system according to claim 11, wherein the delivery system comprises a first delivery rail grid and a second delivery rail grid, wherein the first delivery rail grid is located below a grid structure of the storage grid and the second delivery rail grid is located outside the grid structure of the storage grid, the first and the second delivery rail grids being connected such that the delivery vehicle can operate between the first and second delivery rail grids.

14. The automated storage and retrieval system according to claim 13, wherein the access point is located on the second delivery rail grid.

15. The automated storage and retrieval system according to claim 11, wherein the delivery vehicle is configured to return the storage container or a different storage container to the delivery column for storage within the storage grid.

16. A method of transporting a container to an access point of a delivery system according to claim 1, the access point being a location on the delivery rail grid for a robotic or human operator to access an item held in the container that has been delivered to the access point,
wherein the method comprises the step of:
a) operating the delivery vehicle carrying a first container to direct the delivery vehicle to the at least one conveyor line;
b) operating the delivery vehicle to deliver the first container to the conveyor line for transport to the access point;
c) operating the delivery vehicle to receive a second container that has been handled at the access point from the at least one conveyor line,
d) transporting the second container to an external location.

17. The method according to claim 16, wherein the external location is a high priority area.

* * * * *